US009952827B2

(12) United States Patent
Gattis

(10) Patent No.: US 9,952,827 B2
(45) Date of Patent: Apr. 24, 2018

(54) DYNAMIC ADJUSTMENT OF EQUALIZATION SETTINGS OF AUDIO COMPONENTS VIA A SOUND DEVICE PROFILE

(71) Applicant: Comcast Cable Communications, LLC, Philadelphia, PA (US)

(72) Inventor: Galen Trevor Gattis, Sunnyvale, CA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 41 days.

(21) Appl. No.: 15/097,970

(22) Filed: Apr. 13, 2016

(65) Prior Publication Data

US 2017/0300289 A1  Oct. 19, 2017

(51) Int. Cl.
*H03G 5/00* (2006.01)
*G06F 3/16* (2006.01)
*G10L 19/018* (2013.01)

(52) U.S. Cl.
CPC ............ *G06F 3/165* (2013.01); *G10L 19/018* (2013.01)

(58) Field of Classification Search
CPC .............................. G06F 3/165; G10L 19/018
USPC ......................................................... 381/103
See application file for complete search history.

(56) References Cited

U.S. PATENT DOCUMENTS

| 2003/0035555 A1* | 2/2003 | King ...................... H03G 5/005 381/103 |
| 2007/0189548 A1* | 8/2007 | Croft, III ............... G10K 15/02 381/77 |
| 2011/0091051 A1* | 4/2011 | Thomason ............ G06F 1/1616 381/103 |
| 2014/0177753 A1* | 6/2014 | Wang ..................... H04W 4/18 375/296 |
| 2015/0098590 A1* | 4/2015 | Oswell .................... H04R 3/04 381/120 |
| 2015/0193196 A1* | 7/2015 | Lin ......................... G06F 3/165 715/716 |

* cited by examiner

*Primary Examiner* — Katherine Faley
(74) *Attorney, Agent, or Firm* — Banner & Witcoff, Ltd.

(57) ABSTRACT

Methods, computing devices, and systems that apply equalization settings for particular audio devices based on a content audio profile. A computing device may detect at least one audio device connected to the computing device and request a device sound profile of the at least one audio device from a database remote from the computing device. Computing device may receive the device sound profile of the at least one audio device from the remote database. The computing device may receive content comprising an audio component and a video component and a content audio profile associated with the audio component. The computing device can determine whether to adjust equalizer settings for sound reproduction of the audio component based on the audio profile and the device sound profile of the at least one audio device.

26 Claims, 5 Drawing Sheets

DYNAMIC ADJUSTMENT OF EQUALIZATION SETTINGS OF AUDIO COMPONENTS VIA A SOUND DEVICE PROFILE

BACKGROUND

A variety of content may be played or outputted on different devices. Different types of content may have different characteristics. A user may wish to adjust or modify these characteristics before a device plays or outputs the content. It may be inefficient and tedious for a user to change the settings on the output device for each type of content. Methods and systems are needed to provide a better experience for consuming content

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Some aspects of this disclosure relate to methods, systems and computing devices that apply equalization settings for particular audio devices based on a content audio profile. In some aspects, a computing device may detect at least one audio device connected to the computing device and request a device sound profile of the at least one audio device from a database remote from the computing device. Computing device may receive the device sound profile of the at least one audio device from the remote database. The computing device may receive content comprising an audio component and a video component and a content audio profile associated with the audio component. The computing device can determine whether to adjust equalizer settings for sound reproduction of the audio component based on the audio profile and the device sound profile of the at least one audio device.

The summary here is not an exhaustive listing of the novel features described herein, and are not limiting of the claims. These and other features are described in greater detail below.

BRIEF DESCRIPTION OF THE DRAWINGS

The present disclosure is shown by way of example and not limited in the accompanying figures in which like reference numerals indicate similar elements and in which.

DETAILED DESCRIPTION

In the following description of various example embodiments, reference is made to the accompanying drawings, which form a part hereof, and in which is shown, by way of example, various embodiments in which aspects of the disclosure may be practiced. It is to be understood that other embodiments may be utilized, and structural and functional modifications may be made, without departing from the scope of the present disclosure.

Figure 1:
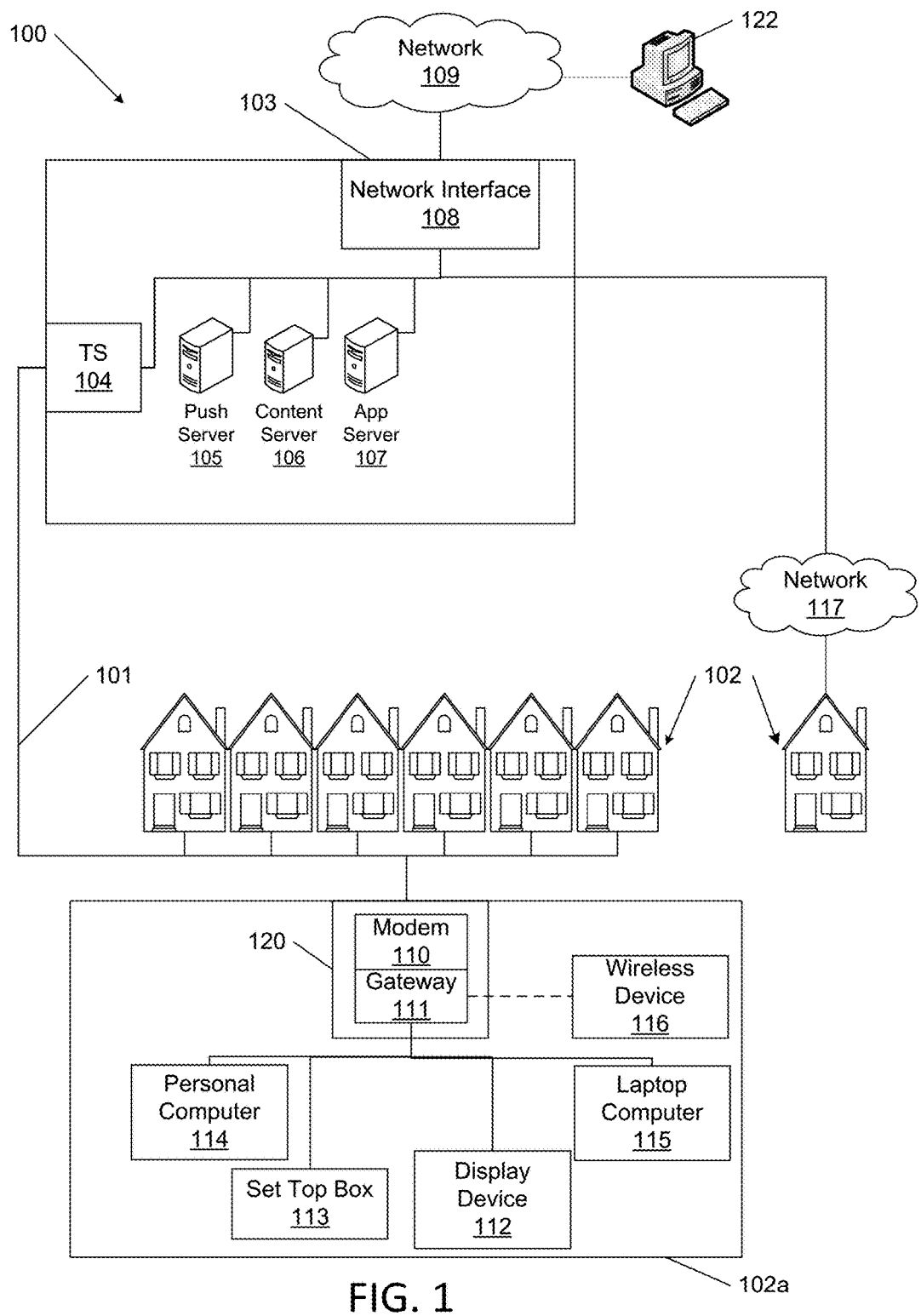
FIG. 1 shows an example network according to one or more aspects described herein.

FIG. 1 shows an example network 100 on which many of the various features described herein may be implemented. The network 100 may be any type of information distribution network, such as satellite, telephone, cellular, wireless, optical fiber network, coaxial cable network, and/or a hybrid fiber/coax (HFC) distribution network. Additionally, the network 100 may be a combination of networks. The network 100 may use a series of interconnected communication links 101 (e.g., coaxial cables, optical fibers, wireless, etc.) and/or some other network 117 (e.g., the Internet) to connect an end-point to a local office or headed 103. Example end-points are shown in FIG. 1 as premises 102 (e.g., businesses, homes, consumer dwellings, etc.). The local office 103 (e.g., a data processing and/or distribution facility) may transmit information signals onto the links 101, and each premises 102 may have a receiver used to receive and process those signals.

There may be one link 101 originating from the local office 103, and it may be split a number of times to distribute the signal to various homes 102 in the vicinity (which may be many miles) of the local office 103. The links 101 may include components not shown, such as splitters, filters, amplifiers, etc. To help convey the signal clearly, but in general each split introduces a bit of signal degradation. Portions of the links 101 may also be implemented with fiber-optic cable, while other portions may be implemented with coaxial cable, other links, or wireless communication paths.

The local office 103 may include a termination system (TS) 104, such as a cable modem termination system (CMTS) in a HFC network, which may be a computing device configured to manage communications between devices on the network of links 101 and backed devices such as servers 105-107 (to be discussed further below). The TS may be as specified in a standard, such as the Data Over Cable Service Interface Specification (DOCSIS) standard, published by Cable Television Laboratories, Inc. (a.k.a. CableLabs), or it may be a similar or modified device instead. The TS may be configured to place data on one or more downstream frequencies to be received by modems or other user devices at the various premises 102, and to receive upstream communications from those modems on one or more upstream frequencies. The local office 103 may also include one or more network interfaces 108, which can permit the local office 103 to communicate with various other external networks 109 and computing devices 122 connected to the external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various homes 102 in the network (or more specifically, to the devices in the homes 102 that are configured to detect such notifications). The local office 103 may also include a content server 106. The content server 106 may be one or more computing devices that are configured to provide content to users in the homes. This content may be, for example, video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the premises 102. Another application server may be responsible for formatting and providing data for an interactive service being transmitted to the premises 102 (e.g., chat messaging service, etc.).

An example premises 102a may include an interface 120. The interface 120 may comprise a modem 110, which may include transmitters and receivers used to communicate on the links 101 and with the local office 103. The modem 110 may be, for example, a coaxial cable modem (for coaxial cable links 101), a fiber interface node (for fiber optic links 101), or any other desired device offering similar functionality. The interface 120 may also comprise a gateway interface device 111 or gateway. The modem 110 may be connected to, or be a part of, the gateway interface device 111. The gateway interface device 111 may be a computing device that communicates with the modem 110 to allow one or more other devices in the premises to communicate with the local office 103 and other devices beyond the local office. The gateway 111 may comprise a set-top box (STB), digital video recorder (DVR), computer server, or any other desired computing device. The gateway 111 may also include (not shown) local network interfaces to provide communication signals to devices in the premises, such as display devices 112 (e.g., televisions), additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
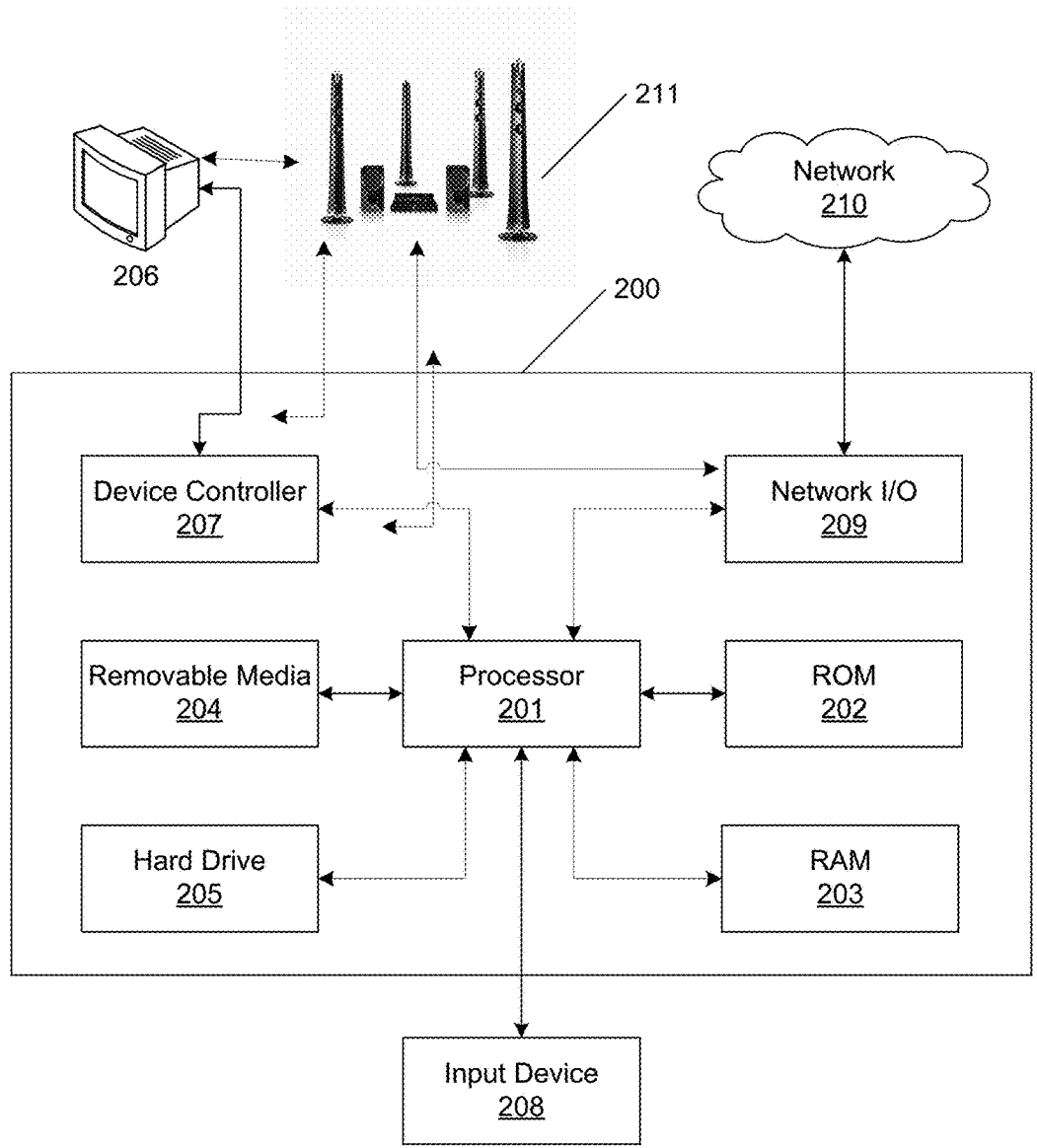
FIG. 2 shows an example computing device on which the various elements described herein may be implemented according to one or more aspects described herein.

FIG. 2 shows an example computing device on which various elements described herein can be implemented. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), speakers 211, and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication links and/or networks shown in FIG. 1, or any other desired network.

The FIG. 2 example is an illustrative hardware configuration. Modifications may be made to add, remove, combine, divide, etc. components as desired. Additionally, the components shown may be implemented using basic computing devices and components, and the same components (e.g., processor 201, storage 202, user interface, etc.) may be used to implement any of the other computing devices and components described herein.

One or more examples of the disclosure may be embodied in computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents such as integrated circuits, field programmable gate arrays (FPGA), application-specific integrated circuits (ASIC), and the like. Particular data structures may be used to more effectively implement one or more aspects of the invention, and such data structures are contemplated within the scope of computer executable instructions and computer-usable data described herein.

Aspects described herein may relate to customizing an equalizer setting for sound or audio output of content based on metadata providing additional information such as audio characteristics of the content being currently outputted. The equalizer setting may be used to change the volume of certain frequencies or frequency ranges relative to other frequencies or frequency ranges. For different types of content or media, it may be more audibly pleasing to emphasize different frequency ranges based on the type of content or media. According to aspects described herein, a computing device (e.g., content device) can receive additional information or metadata about the content or audio and adjust the equalization settings based on the additional information.

Figure 3:
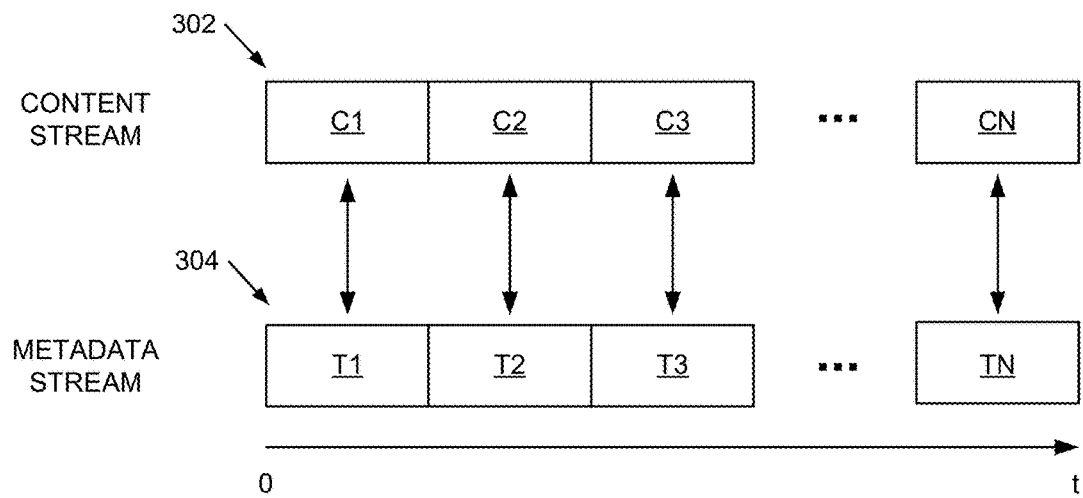
FIG. 3 shows an example content stream and metadata stream according to one or more aspects described herein.

FIG. 3 shows an example of a content stream 302 and corresponding metadata stream 304. The content stream may include an audio component and also a video component. For example, content or a media asset transmitted in a content stream may be different types of media assets including a video program such as a television show, movie, music video, video clip, or other audiovisual content and audio content such as music, radio, book audio, and/or a podcast. A media asset or content stream 302 may be divided into a plurality of segments (C1-CN), and each segment may have corresponding metadata (e.g., audio tag) indicating the audio characteristics of the corresponding segment. For example, segment C1 may be a part of an asset containing only spoken dialogue (i.e., no music) and audio tag T1 for segment C1 may indicate that the audio for segment C1 is voice only. As another example, segment C2 may be a part of an asset or content stream containing music (e.g., hip hop, pop, rock) for which more bass reproduction may be preferable. Audio tag T2 may indicate the music genre of the segment C2 or indicate an equalization (e.g., bass booster) that should be applied to the audio of segment C2. A computing device performing the equalization may determine what kind of audio equalization adjustments to apply based on the music genre.

Metadata stream 304 may be transmitted as a stream separate from content stream 302 and/or metadata may be embedded directly in the audio component of content stream 302. As a separate stream from content stream 302, metadata stream 304 may be transmitted in a manner similar to closed captioning and/or may be transmitted in other manners either associated with the content stream or on a separate transmission media from the content stream. As another example, the metadata could be embedded in an audio codec used in encoding the audio stream. Metadata stream 304 may be transmitted in parallel with content stream 302 or prior to completing transmission of the entire media asset in the stream to enable content device 402 to pre-process and/or pre-determine what equalizer settings may be used for one or more segments of the stream. Once the appropriate points in the content stream have been reached during playback, content device 402 can automatically change the equalization settings at that point. For example, equalization settings may be changed between spoken text (e.g., audio books), voice programs (talk shows), music videos, action movies, horror movies, romantic comedies, and/or between different listening environments. For example, if a user is watching content on his television and then performs a "pack and go" or other function to enable the stream to continue playing on the device as it is moved outside of the home, a different equalization may be applied. For example, as a stream is offloaded to a phone the equalization may be customized to the phone, as speakers are associated with the phone, a new equalization may be applied, and as the phone enters the outdoors, the car, the elevator, and the office, different equalizations may be applied and different audio systems may be associated with the mobile computing device (e.g., phone, tablet, and/or other device) at various locations.

Referring back to FIG. 2, the display 206 may have a speaker system 211 that may include either an internal and/or an external speaker system that has a particular audio profile. The audio profile may be a manufacturer, model number and/or manufacturing date and/or the audio profile may be more complex. For example, in some embodiments, the audio profile may include one or more of a frequency response characteristic of the particular speaker and/or speaker system including such things as number of audio channels, acoustic response characteristics (e.g., bass response, treble response), dynamic range, maximum sound levels, position of speaker, orientation of speaker, size of room, and/or any test pattern responses from the audio system. The audio profile may be communicated from the speaker system 211 to various devices such as to display 206, device controller 207, processor 201, network I/O 209, network 210, push server 105, content server 106 and/or app server 107. Further, the system may include different audio profiles for speech, synthetic audio, high quality audio, music audio, commercial audio for one or more speakers within the speaker system 211. The audio profile(s) may be communicated via a wired and/or wireless interface. In one embodiment, the audio profiles are passed from the display 206 and/or speaker system 211 to the device controller 207, processor 201, network I/O 209, network 210, push server 105, content server 106 and/or app server 107 using a wired and/or wireless connection. The audio profile may be packaged and/or encapsulated in a separate protocol prior to transmission. The audio profile may be tagged with geographic locations (e.g., longitude and latitude and/or location within the home) and/or associated with particular equipment such as a computer, set-top box, phone, table, television, car, boat, and/or other sound enabled device. FIG. 2 shows an example of a system suitable for receiving content stream 302 and/or metadata stream 304.

Figure 4:
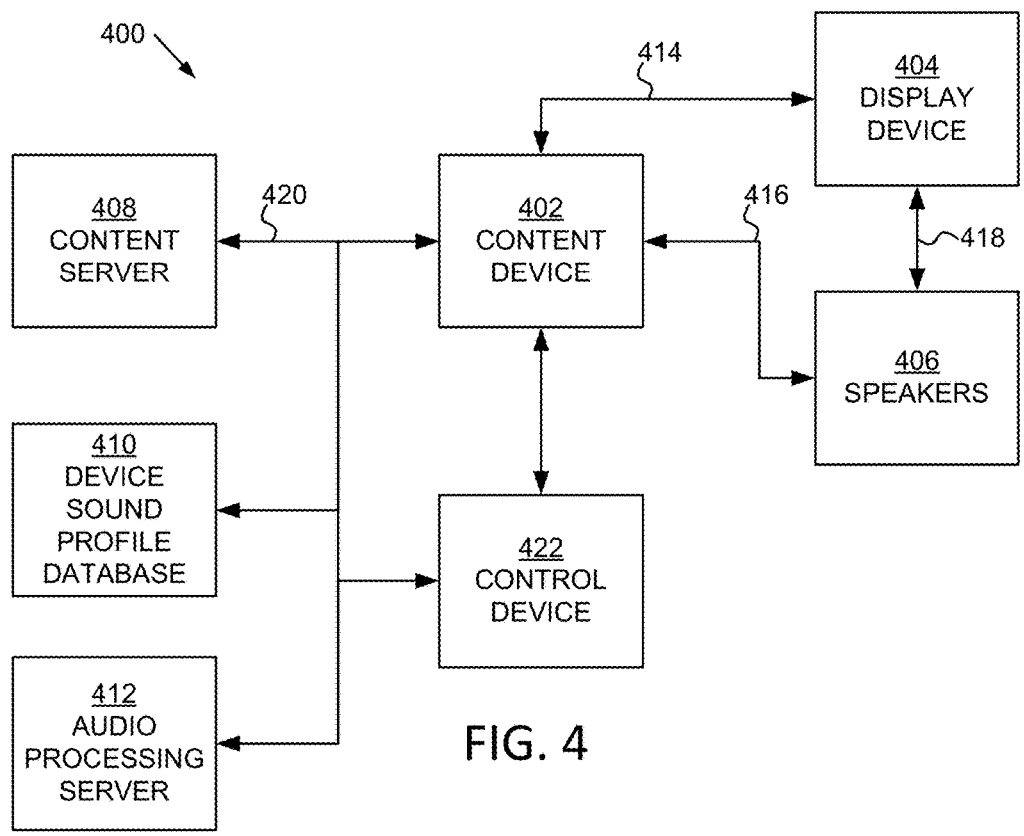
FIG. 4 shows an example dynamic equalizer system according to one or more aspects described herein.

Similarly, FIG. 4 shows an example of system 400 according to aspects described herein. The system 400 may include a content device 402, a display device 404, speakers 406, content source 408, device audio profile database 410, audio processing server 412, and a control device 422. The content device 402 may receive content stream 302 and/or metadata stream 304 from a content source server 408. For example, the content device 402 may be one or more of a modem 110, gateway 111, set top box 113, gaming console, and computer 114, 115. The display device 404 may be a display device 112 or a display of a computer or television. Speakers 406 may be independent speakers such as a sound system, sound bar, external speakers, and/or speakers integrated into another device such as a computer or television. While the system 400 is shown as separate devices, the devices may be integrated into one unit. For example, a television may be a content device 402 and receive content streams over a cable or wireless connection, and the television may include a screen for the display device 404 and speakers 406 as part of the television unit. In another example, the content device 402 may be connected to speakers 406 and the television may be connected to speakers 406.

The content device 402 may be connected to the display device 404 via connection 414 and speakers 406 via connection 416, and the display device 404 and speakers 406 may communicate with each other via connection 418. Connections 414, 416, and 418 may be wired connections such as High-Definition Multimedia Interface (HDMI), component, composite, universal serial bus (USB), audio port, Ethernet (e.g., IEEE 802.3) and/or wireless connections such as Bluetooth and wi-fi (e.g., IEEE 802.11). Some interfaces may be able to provide interactive or bi-directional communication between the connected devices and control devices. For example, the content device 402 may be able to receive device information (e.g., brand, model number, device type, MAC address, manufacturer identifier, manufacturer product code, serial number, date and/or week and/or year of manufacture, and audio characteristics) about the connected device. Audio characteristics of the connected device may include whether the connected device supports stereo, whether the signals synchronization is analog composite, bipolar analog composite, digital composite, or digital separate, and whether two-way line interleaved stereo mode is supported. For example, the device information may be received via extended display identification data (EDID). Using the device information, the content device 402 can determine which device audio profiles correspond to the connected device and request the audio profiles which correspond to the connected devices.

Different combinations of interfaces may be used to connect the devices. The content device 402, display device 404, control device 422, and speakers 406 may be connected to the same local area network generated by gateway 111 or the same interface 120. The connection to the gateway 111 or interface 120 may be any combination of wired connections and/or wireless connections. The devices 402, 404, 406, and 422 may be directly connected to each other using any combination of wired and wireless connections. For example, speakers 406 (e.g., external speakers, sound system, theater system, soundbar, subwoofer) may pass the signal from content device 402 through to the television, and the television may detect that external speakers are being used and send the audio back to speakers 406 for output via speakers 406 by, for example, connecting speakers 406 to an audio return channel (ARC) supported HDMI port on the television. As another example, the content device 402 and/or display device 404 may be connecting to external or standalone speakers 406 (e.g., sound system, theater system, soundbar, subwoofer, portable speakers) wirelessly via a gateway 111 or directly via wi-fi (e.g., using an internet protocol (IP) address of the display device 404 or of speakers 406) and/or Bluetooth (e.g., by pairing with speakers 406) and be able to communicate and control speakers 406 via the wireless connection. For example, the content device 402, display device 404, and/or control device 422 may request to connect directly to speakers 406 and upon establishing a connection with speakers 406, content device 402, display device 404, and/or control device 422 can request device information from speakers 406. In response to the request, speakers 406 can transmit identifying device information (e.g., make, brand, model name, model number, medium access control (MAC) address) to the requesting device(s). Using the device information, one or more of content device 402, display device 404, and/or control device 422 can request device sound profile information from device sound profile database 410 to perform the equalization adjustments at the content device 402, display device 404, and/or control device 422 as described herein. One or more of content device 402, display device 404, and/or control device 422 can transmit the device information to audio processing server 412, and audio processing server 412 can request the device sound profile of speakers 406 from device sound profile database 410. Using the device sound profile of speakers 406, audio processing server 412 can apply equalization settings (as described herein) based, for example, on audio tags of the content and/or the device sound profile. In addition or in the alternative, one or more of content device 402, display device 404, audio processing server 412 and/or control device 422 may request the device sound profile(s) based on detecting at least one audio device, e.g. speakers 406.

Each user may also have different speaker system setups. For example, a user may be using a small, portable speaker or television speakers which might not have many bass boosting capabilities, and another user may be using a soundbar with a subwoofer. The content device 402 may obtain a device sound profile for the specific speaker system or device from device audio profile database 410 because each speaker may have different pre-tuned or acoustic audio characteristics causing different speakers to have different optimal equalization settings and each speaker may have different frequency range capabilities. Some manufacturers may tune their speakers to heavily emphasize bass frequency ranges. For these speakers, boosting of the bass might not be necessary even though an audio tag would ordinarily call for boosting the bass. In another scenario, a user may be playing music or an audiobook for which heavy bass emphasis may be undesirable. The device sound profile may provide the speakers' acoustic frequency response amplitude in different frequency ranges absent application of any other enhancements or equalization settings.

Based on the sound profile, the content device 402 and/or audio processing device 412 can adapt preset settings to the particular device. For example, the content device 402 and/or audio processing device 412 may determine the difference between the sound profile of the particular speaker and equalization setting specified for the corresponding audio tag and apply the difference as the equalizer setting for the audio signal. For example, the equalization setting for voice may emphasize frequencies within the range of the human voice and de-emphasize frequencies outside of those ranges and provide a relative relationship between the frequencies and/or frequency ranges. Equalization settings may be applied to ranges of frequencies, for example, each range of frequencies may have the same decibel level. Equalization settings may be applied as a function that provides a continuous adjustment over the different frequencies.

In some aspects, a tag-specific device audio profile may be stored in the database 410 in addition to or instead of the device audio profile for the particular speaker model which takes into account equalization setting specified for the audio tag. The tag-specific device audio profile may contain preset equalizer settings to use with different types of audio tags that can be used according to user preferences and/or provider settings.

The equalization settings can be applied by one or more devices such as content device 402, content server 408, audio processing server 412, and/or control device 422. Content device 402 can apply equalization settings to an audio signal before outputting the audio signal to an audio device. For example, if audio device 406 is connected to the content device 402 via an audio port (e.g., 3.5 mm headphone jack), the content device 402 may adjust its equalization settings that are applied to the audio signal by the content device 402 before outputting the audio signal via the audio port to audio device 406. As another example, if the audio device 406 is a television speaker(s), the content device 402 may send control signals to the television to change equalization settings according to the control signals. As yet another example, some standalone speaker units may allow users to adjust the internal equalization settings of the speaker units via an application that connects to the speaker units directly or via a local area network. The content device 402 may adjust equalization settings of the standalone speakers.

In some aspects, customized equalization can be applied before the content reaches the content device 402. The content device 402 may receive device information about the display device 404 and/or speakers 406 and send the device information to audio processing server 412 which may be an application server 107. The audio processing server 412 may receive content stream 302 and metadata stream 304 from content source 408 and modify the audio component of content stream 302 by applying the equalization setting as discussed herein to the audio component of the content stream 302. The audio processing server 412 can transmit the modified content stream 302 to content device 402 where content device can cause the content to be outputted on display device 404 and speakers 406 without needing further processing and/or equalization adjustment. For example, the audio component can be pre-customized or pre-equalized based on the audio tag and device information of speakers 406 before transmitting the content stream 302 to a device (e.g., content device 402) at a customer premises (e.g., premises 102a). For pre-equalized content, metadata stream 304 may include an audio tag indicating that the corresponding content segment is pre-equalized. For example, the audio processing server 412 can insert audio tags and/or change the audio tags to indicate pre-equalization. Based on the pre-equalized indication, the content device 402 can determine that additional equalization settings might not be applied and pass the audio component to the speakers with a flat equalization setting (e.g., equalization for all frequencies is at the same decibel (db) (e.g., 0 db)). In addition and/or in the alternative, one or more of the audio processing server 412 and/or control device 422 may receive pre-equalized content (with, for example, audio tags indicating pre-equalization) from another source, may determine that additional equalization settings might not be applied and may pass the audio component to the speakers with a flat equalization setting.

In another aspect, the control device 422 can be used to enable user input for the equalization settings and/or control various aspects described herein. The control device 422 can be a computing device (e.g., computers 114, 115), mobile phone (e.g., wireless device 116), smartwatch, wearable device, smartphone, tablet, or other local device. The control device 422 can present a user interface where a user can adjust and save equalization settings for different types of audio or audio tags and select between different audio themes or profiles to use. The control device 422 may be used to control the content device 402 and/or audio processing server 412 to adjust and save equalization settings for different types of audio or audio tags and select between different audio themes or profiles to use. A user can associate different audio themes with different audio tags. The user can create an equalization setting by selecting which frequencies or frequency ranges are to be amplified relative to other frequency ranges and save the equalization setting as an audio theme or profile. As an example, the user may create a bass boosting equalizer setting for a bass boost theme which increases the volume or intensity (e.g., decibel) of frequencies in the 20 Hz to 500 Hz range while maintaining the relative volume or intensity of frequencies outside of this range (e.g., 0 decibel), and the user can associate the bass boost theme with certain audio tags for music genres (e.g., rock, hip hop, pop, jazz) and/or audio tags for audiovisual content (e.g., music video, movie, concert video recording). The user created equalization settings or audio themes may be saved in the control device 422, content device 402, and/or audio processing server 412.

The control device 422 may be used to dynamically change audio themes. For example, the content device 402 and/or audio processing server 412 may adjust equalization automatically based on current or previous equalization settings, and the user may use the control device 422 to control the current audio theme being applied by transmitting commands to content device 402 and/or audio processing server 412 requesting that a user selected audio theme be used. The control device 422 can retrieve a list of available audio themes from a memory or cache of the control device 422 and/or from content device 402 and/or audio processing server 412.

The control device 422 may enable a user to dynamically change which speakers the equalization performed by content device 402, audio processing server 412, display device 404, and/or control device 422 is processed for. For example, display device 404 and speakers 406 may be a television and the codecs and equalization settings may be customized for the specific television. The user may connect an external speaker (e.g., soundbar) to the television via an interface of the television and use control device 422 to change the codecs and equalization settings being used to be for the external speaker. More specifically, control device 422 can determine available external speakers via user or automatic input, setup, or pairing and provide the user with a list of available speakers for audio output. In response to a user selecting the external speaker for output, control device 422 can notify content device 422 and/or audio processing server 412 to change the equalization settings and/or codecs to be customized for the external speaker. If an application on control device 422 is controlling the equalization settings being applied, control device 422 can change the equalization settings being applied to those for the external speaker.

As another example, a computing device (e.g., tablet, smartphone) may be accessing the content while connected to external speakers via an audio and/or data port, and an equalization setting or codec for the speakers internal to the smartphone or tablet may be being used. A user may manually select the external speakers that are being used and/or the computing device can detect that external speakers are connected and automatically obtain device information from the external speakers. Using the device information or based on user selection, an equalization setting customized to the connected external speakers may be used. For example, the computing device may receive an indication of a selection of new and/or different audio device(s) configured to output the audio component of a content stream. In response to receiving the indication, the computing device may request from the device sound profile database 410 an audio profile for the new and/or different audio device(s) and adjust the equalization setting (configured for the original audio device(s)) based on the audio profile for the new and/or different device(s) and/or based further based on the audio profile of the content stream.

In some aspects, at least one of the devices (e.g., content device 402, control device 422, speakers 406, display device 404) in system 400 may include a microphone or other input device which can receive or listen to the sound in the environment. Content device 402 may analyze the ambient sound received from the microphone and identify acoustic characteristics of the ambient sound (e.g., volume level of background noise, types of background noise). Based on the acoustics characteristics of the ambient sound, content device 402 may automatically adjust the equalization settings to change the overall volume and/or emphasize or de-emphasize particular frequencies or frequency ranges. For example, the content device 402 may be a portable device (e.g., tablet, smartphone, computer) and the content device 402 may determine that the user has moved the content device 402 from quiet environment to a noisy environment. In response to entering a noisier environment, the content device 402 may apply a volume boosting and/or noise-canceling equalization setting based on the ambient sound received via the microphone. Similarly, when the content device leaves the noisy environment, the content device 402 can remove the volume boosting and/or noise-canceling equalization setting.

The device sound profile database 410 may be populated with device sound profiles comprising the frequency response characteristics of various speakers and/or speaker systems. The database 410 may be, for example, push server 105, content server 106, and/or app server 107. The device sound profile database 410 may store device information (e.g., brand name, model number, model name, etc.) and associate a particular device with its frequency response characteristics. In some aspects, a programming remote may be able to identify a television being used based on the programming code used for the television and cause the database 410 to index the audio characteristics and/or frequency response characteristics of the television.

In some aspects, the content device 402 may have the ability to identify which users are viewing the content on the display device and/or listening to audio from speakers. Based on the users, the content device 402 may be able to adjust equalization settings and/or volume of speakers to suit the users. For example, a baby may have sensitive ears and have better hearing than adults, and parents can use a customized equalization setting for babies. Similarly, some adults may experience significant hearing loss, and the content device 402 may determine an adult with significant hearing loss is one of the users and adjust the equalization settings to emphasize voice over other sounds while the adult with hearing loss is consuming content. Once the adult with hearing loss leaves the room and/or is no longer viewing the content, content device 402 may sense this movement and return the equalization settings to normal settings. Determination or identification of which users are viewing content may be accomplished via facial recognition and/or according to U.S. application Ser. No. 14/313,518 filed Jun. 24, 2014 which is assigned to the assignee of the instant application, entitled "COMMAND SOURCE USER IDENTIFICATION", and published as U.S. Publication No. 2015-0373408 A1. U.S. application Ser. No. 14/313,518 is hereby incorporated by reference.

In some aspects, the content device 402 may have access to video program schedule information containing information regarding the title and description of a program being shown on a channel and the time at which the program starts and ends as well as the type of program (e.g., movie, news, sports, drama, television show, music, etc.) which may be in the form an electronic program guide (EPG). The content device 402 may receive a selection to view a sports game. The content device 402 may be programmed to apply an equalizer setting for voice for sports games and can apply a voice equalizer setting while the user is viewing the sports game. The content device 402 can determine when the sports game ends based on the video program schedule information and change the equalizer settings as appropriate for the next video program on the schedule. For example, if the next program following the sports game is a movie, content device 402 can apply a movie equalizer setting for the duration of the movie and/or apply equalizer settings according to audio tags corresponding to segments in the movie according to aspects described herein. Similarly, if the content device 402 receives a command from a user to change the content being displayed (e.g., change to another channel), the content device 402 can evaluate the content currently displayed and apply equalization settings based on the content.

In another example, the speakers being used may be changed based on the program type (e.g., movie, news, sports, drama, television show, music, etc.) being viewed or displayed. The content device 402 can determine the type of program being viewed or displayed, and the content device 402 may automatically select the speakers to use based on the program type. For example, for program types which are primarily speech such as news programs or sports programs, the speakers used may be internal speakers of the display device 404 (e.g., internal speakers of a television). If the program type being viewed is a movie or music, etc., the content device 402 may change the output speakers to be an external speaker system (e.g., home stereo system, sound bar, subwoofer) in response to identifying the program as a movie or music, etc. The equalization setting used with the selected external speakers may be based on the program type and/or the device sound profile of the particular external speakers being used.

In another aspect, the content device 402 may apply equalization settings based on the type of content within content stream 302. For example, the content device 402 can determine whether a video program is being shown or whether an advertisement is being shown based on tags in metadata stream 304. The content device 402 may adjust equalization settings to de-emphasize volume of advertisements. In some aspects, a producer of the advertisement may select a specific equalization setting to apply for the advertisement, and an audio tag corresponding to the advertisement may specify an equalization profile to use from memory. The equalization profile from the advertisement producer may specify a general equalization setting to apply for the duration of the advertisement or may specify different equalization settings for different points in time in the advertisement.

Figure 5:
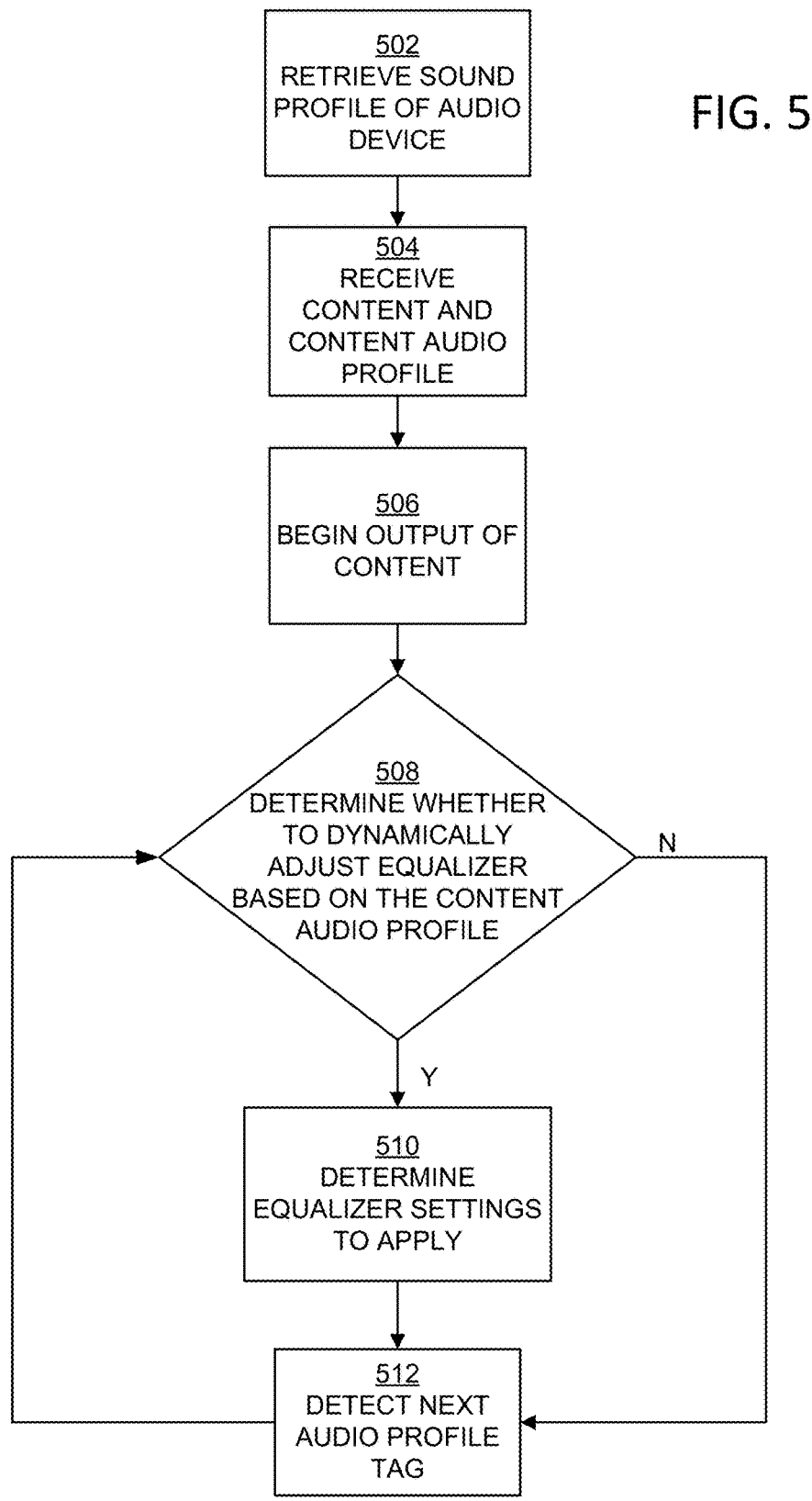
FIG. 5 shows an example method of performing dynamic equalization according to one or more aspects described herein.

FIG. 5 shows an example of a method 500 for automatically customizing equalization settings for content. At step 502, a sound profile of an audio device may be retrieved. For example, the content device 402 may determine what devices are connected to the content device for sound output and request the sound profile of the devices from device sound profile database 410. The content device 402 can request the sound profile of the devices by transmitting a request identifying the devices, for example, by device type (e.g., soundbar, subwoofers, tweeters, medium-range speakers, standing speakers, portable speakers) and/or by brand and model name and/or number. In response to the request, the content device 402 may receive a response including sound profiles of the requested devices.

At step 504, content and a content audio profile may be received via one or more streams transmitted from a content server 106, 408 to the content device 402. The content and the content audio profile may be transmitted to the content device 402 in response to a request and/or by tuning to a channel. The content audio profile may be transmitted in metadata stream 304 and/or in content stream 302. The content audio profile packets may be separated from the content packets using the packet identifier (PID) of packets in the streams 302, 304.

At step 506, the content device can begin processing the content for output and cause output of the content to begin. For example, the content device 402 may cause the video component of the content to be displayed or presented on the display device 404 and cause the audio component of the content to be output to a listener or user via speakers 406.

At step 508, the content device 402 may identify an audio tag for the audio corresponding to the video component currently being displayed on display device 404 and determine whether to adjust equalization settings of the corresponding audio component for speakers 406 based on a device audio profile of speakers 406 and/or the audio tag.

For example, the audio tag may indicate that the corresponding content segment contains rock music, and the content device 402 may apply a bass boosting equalization setting for the rock music segment. In some aspects, the content device 402 may have a specific rock music equalization setting. As another example, the audio tag may identify a content producer specified equalization setting and contain an identifier for the specific equalization setting. The content device 402 can request the content producer equalization setting from a remote database and/or retrieve the content producer equalization setting from a local memory.

At step 510, the content device 402 may determine an equalizer setting to apply for audio components corresponding to the video component being displayed. The equalization setting may be pre-set or stored in a memory (prior to initiating playback of the corresponding content segment) for quick retrieval and application of the equalization setting in sync with the corresponding content segment. This ensures that the equalization setting is in synchronicity with its corresponding content segment, e.g. the equalization setting is aligned with the proper content segment based on the audio tag.

At step 512, the content device 402 may identify or detect a next audio profile tag in the content audio profile and return to step 508 to determine whether to adjust the equalizer based on the next audio profile tag for the corresponding audio segment. Steps 508, 510, and 512 may be repeated until content device 402 completes processing of all of the metadata or audio tags in metadata stream 304.

Optionally, at any time during method 500, if a new and/or different audio device(s) is selected and/or detected (either automatically or by a user), then the process may return to step 502 and begin again.

Figure 6:
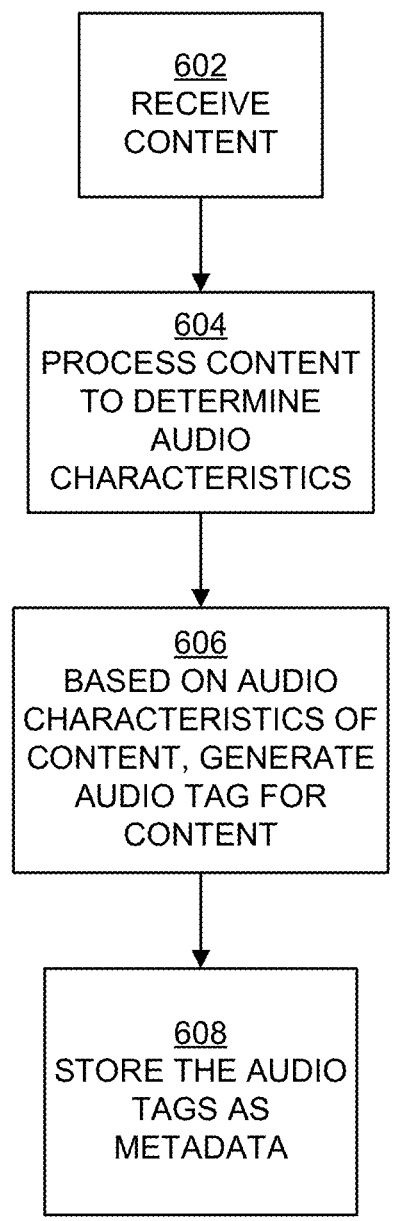
FIG. 6 shows an example method of generating metadata according to one or more aspects described herein.

FIG. 6 shows an example of a method 600 for processing content to tag audio according to aspects described herein. At step 602, a computing device (e.g., app server 107) can receive a media asset or content to process for audio tagging.

At step 604, computing device can begin processing the audio of the media asset to determine audio characteristics. The computing device could perform fingerprinting on the audio and detect that a section of the media does not contain any music and contains dialogue. The computing device may mark the section of the media with a voice or voice only tag. For example, the computing device can identify the section of the media asset using a beginning time and an end time within the runtime of the media asset. At step 606, the computing device can generate an audio tag corresponding to the section of the media asset. The computing device can repeat steps 604 and 606 until the entire media asset has been processed and tagged. At step 608, the computing device can store the audio tags as metadata with the content in content source 408.

Aspects of the disclosure have been described in terms of example embodiments thereof. While example systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned examples may be utilized alone or in combination or subcombination with elements of the other examples. For example, any of the above described systems and methods or parts thereof may be combined with the other methods and systems or parts thereof described above. For example, the steps shown in the figures may be performed in other than the recited order, and one or more steps shown may be optional in accordance with aspects of the disclosure. It will also be appreciated and understood that modifications may be made without departing from the true spirit and scope of the present disclosure. The description is thus to be regarded as showing examples instead of restrictive on the present disclosure.

What is claimed is:

1. A method comprising:
    detecting, by a computing device, an audio device in communication with the computing device;
    receiving, by the computing device, a device sound profile associated with the audio device;
    receiving, by the computing device, content comprising:
    an audio component, and
    a plurality of different equalization adjustments corresponding to different segments of the audio component; and
    adjusting, by the computing device and based on one or more equalization adjustments of the plurality of different equalization adjustments and the device sound profile, equalization settings of one or more of the different segments of the audio component.

2. The method of claim 1, wherein equalization settings of a first segment of the audio component comprises a plurality of settings corresponding to different frequency ranges of the first segment of the audio component.

3. The method of claim 1, further comprising:
    determining whether to dynamically adjust, based on an equalization adjustment, of the plurality of different equalization adjustments, corresponding to a first segment of the audio component, a first frequency range of the first segment relative to a second frequency range of the first segment.

4. The method of claim 1, further comprising:
    receiving, by the computing device, an indication of a selection of an other audio device for outputting the audio component.

5. The method of claim 4, further comprising:
    in response to receiving the indication, requesting, from a remote device, a device sound profile associated with the other audio device; and
    adjusting, based on an equalization adjustment corresponding to a first segment of the audio component, and the device sound profile associated with the other audio device, equalization settings of the first segment of the audio component.

6. The method of claim 1,
    wherein the adjusting the equalization settings of one or more of the different segments of the audio component comprises determining that a first segment of the audio component is pre-equalized, and
    wherein the method further comprises:
    transmitting, to the audio device, the first segment of the audio component using a flat equalization setting.

7. The method of claim 1, further comprising:
    detecting, by the computing device, ambient sound; and
    adjusting, in response to the detecting the ambient sound and based on the ambient sound, the equalization settings of the one or more of the different segments of the audio component.

8. The method of claim 1, further comprising:
    determining, based on an equalization adjustment corresponding to a first segment of the audio component, an other audio device in communication with the computing device; and
    transmitting, to the other audio device, a second segment of the audio component.

9. A method comprising:
receiving, by an audio processing device, device information associated with an audio device in communication with a first remote computing device;
receiving, by the audio processing device, a device sound profile for the audio device;
receiving, by the audio processing device, content comprising:
an audio component, and
a plurality of audio tags corresponding to different segments of the audio component, wherein a first segment of the audio component is associated with a first audio tag indicating equalization adjustment corresponding to the first segment;
adjusting, by the audio processing device and based on the device sound profile and the first audio tag, equalization settings of the first segment of the audio component;
applying, by the audio processing device, the adjusted equalization settings to modify the first segment of the audio component; and
transmitting, to the first remote computing device, at least the first segment of the audio component.

10. The method of claim 9, wherein the equalization settings of the first segment comprise a plurality of settings corresponding to different frequency ranges of the first segment of the audio component.

11. The method of claim 10, wherein the adjusting the equalization settings of the first segment further comprises:
causing, based on the first audio tag, one or more settings, of the plurality of settings, to adjust in synchronicity with presentation of the first segment.

12. The method of claim 9, further comprising:
receiving, by the audio processing device, an indication of a selection of an other audio device for outputting the audio component.

13. The method of claim 12, further comprising:
in response to receiving the indication of the selection of the other audio device, requesting, from a second remote computing device, a device sound profile associated with the other audio device; and
adjusting, by the audio processing device and based on the device sound profile associated with the other audio device and the plurality of audio tags, equalization settings of a second segment of the audio component.

14. The method of claim 9, further comprising:
determining whether to dynamically adjust, based on the first audio tag, a first frequency range of the first segment relative to a second frequency range of the first segment.

15. An apparatus comprising:
one or more processors; and
memory storing instructions that, when executed by the one or more processors, cause the apparatus to:
detect an audio device in communication with the apparatus;
receive a device sound profile associated with the audio device;
receive content comprising:
an audio component, and
a plurality of different equalization adjustments corresponding to different segments of the audio component; and
adjust, based on the plurality of different equalization adjustments and the device sound profile, equalization settings of one or more of the different segments of the audio component.

16. The apparatus of claim 15, wherein the instructions, when executed by the one or more processors, cause the apparatus to:
receive video schedule information for the content; and
adjust, based on the video schedule information, the equalization settings of the one or more of the different segments of the audio component.

17. The apparatus of claim 15, wherein the apparatus further comprises a listening device, and wherein the instructions, when executed by the one or more processors, cause the apparatus to:
detect, by the listening device, ambient sound;
determine acoustic characteristics of the ambient sound; and
adjust, based on the determined acoustic characteristics, the equalization settings of the one or more of the different segments of the audio component.

18. The apparatus of claim 15, wherein the instructions, when executed by the one or more processors, cause the apparatus to:
determine, based on an equalization adjustment corresponding to a first segment of the audio component, an other audio device in communication with the apparatus; and
transmit, to the other audio device, a second segment of the audio component.

19. The apparatus of claim 15, wherein the instructions, when executed by the one or more processors, cause the apparatus to:
receive an indication of a selection of an other audio device to output the audio component;
in response to receiving the indication, request, from a remote device, a device sound profile associated with the other audio device; and
adjust, based on an equalization adjustment corresponding to a first segment of the audio component, and the device sound profile associated with the other audio device, equalization settings of the first segment.

20. The apparatus of claim 15, wherein equalization settings of a first segment of the audio component comprise a plurality of settings corresponding to different frequency ranges of the first segment of the audio component.

21. An apparatus comprising:
one or more processors; and
memory storing instructions that, when executed by the one or more processors, cause the apparatus to:
receive device information associated with an audio device in communication with a first remote computing device;
receive a device sound profile for the audio device;
receive content comprising:
an audio component, and
a plurality of audio tags corresponding to different segments of the audio component, wherein a first segment of the audio component is associated with a first audio tag indicating equalization adjustment corresponding to the first segment;
adjust, based on the device sound profile and the first audio tag, equalization settings of the first segment of the audio component;
apply the adjusted equalization settings to modify the first segment of the audio component; and
transmit, to the first remote computing device, at least the first segment of the audio component.

22. The apparatus of claim 21, wherein the equalization settings of the first segment comprise a plurality of settings corresponding to different frequency ranges of the first segment of the audio component.

23. The apparatus of claim 22, wherein the instructions, when executed by the one or more processors, cause the apparatus to adjust the equalization settings of the first segment by:
  causing, based on the first audio tag, one or more settings, of the plurality of settings, to adjust in synchronicity with presentation of the first segment.

24. The apparatus of claim 21, wherein the instructions, when executed by the one or more processors, cause the apparatus to:
  receive an indication of a selection of an other audio device for outputting the audio component.

25. The apparatus of claim 24, wherein the instructions, when executed by the one or more processors, cause the apparatus to:
  in response to receiving the indication of the selection of the other audio device, request, from a second remote computing device, a device sound profile associated with the other audio device; and
  adjust, based on the device sound profile associated with the other audio device and the plurality of audio tags, equalization settings of a second segment of the audio component.

26. The apparatus of claim 21, wherein the instructions, when executed by the one or more processors, cause the apparatus to:
  determine whether to dynamically adjust, based on the first audio tag, a first frequency range of the first segment relative to a second frequency range of the first segment.

* * * * *

UNITED STATES PATENT AND TRADEMARK OFFICE
CERTIFICATE OF CORRECTION

PATENT NO. : 9,952,827 B2
APPLICATION NO. : 15/097970
DATED : April 24, 2018
INVENTOR(S) : Galen Trevor Gattis Page 1 of 1

It is certified that error appears in the above-identified patent and that said Letters Patent is hereby corrected as shown below:

In the Drawings

Drawing Sheet 4 of 5, Figure 4:
Please insert --500--

Drawing Sheet 5 of 5, Figure 6:
Insert --600--

In the Specification

Column 1, Line 15:
After "content", insert --.--

Column 2, Line 21:
Delete "headed" and insert --headend--

Column 2, Line 33:
Delete "To" and insert --to--

Column 2, Line 43:
Delete "backed" and insert --backend--

Column 10, Line 19:
Delete "422" and insert --402--

Signed and Sealed this
Twenty-fifth Day of December, 2018

Andrei Iancu
*Director of the United States Patent and Trademark Office*